(12) United States Patent
Ou et al.

(10) Patent No.: US 12,425,424 B1
(45) Date of Patent: Sep. 23, 2025

(54) URL PARAMETER VALUE ANOMALY DETECTION METHOD AND SYSTEM FOR THE SAME

(71) Applicant: IcloudShield Security Technology Co., Ltd., Beijing (CN)

(72) Inventors: Huaigu Ou, Beijing (CN); Chuanshe Zhang, Beijing (CN); Xiaoqing Wang, Beijing (CN); Qian Ding, Beijing (CN)

(73) Assignee: IcloudShield Security Technology Co., Ltd., Beijing (CN)

( * ) Notice: Subject to any disclaimer, the term of this patent is extended or adjusted under 35 U.S.C. 154(b) by 0 days.

(21) Appl. No.: 19/000,479

(22) Filed: Dec. 23, 2024

(30) Foreign Application Priority Data

Jan. 19, 2024 (CN) .......................... 202410080426.6

(51) Int. Cl.
*H04L 9/40* (2022.01)
(52) U.S. Cl.
CPC ............................... *H04L 63/1416* (2013.01)
(58) Field of Classification Search
CPC .................................................. H04L 63/1416
USPC ............................................................. 726/22
See application file for complete search history.

(56) References Cited

U.S. PATENT DOCUMENTS

| | | | | |
|---|---|---|---|---|
| 7,849,507 | B1 * | 12/2010 | Bloch ................... | H04L 63/168 726/22 |
| 8,286,237 | B2 * | 10/2012 | Moghe ................ | H04L 63/1408 726/25 |
| 10,785,255 | B1 * | 9/2020 | Otvagin ................ | H04L 63/145 |
| 11,621,966 | B1 * | 4/2023 | Yu ........................ | H04L 63/1416 726/23 |
| 2012/0304288 | A1 * | 11/2012 | Wright ................ | H04L 63/1425 726/22 |
| 2015/0096022 | A1 * | 4/2015 | Vincent ................ | G06F 21/562 726/23 |
| 2023/0195715 | A1 * | 6/2023 | Schleith ................ | G06F 16/285 707/691 |
| 2023/0199025 | A1 * | 6/2023 | Xu .......................... | G06F 21/55 726/22 |

FOREIGN PATENT DOCUMENTS

| | | |
|---|---|---|
| CN | 105516128 A | 4/2016 |
| CN | 106131071 A | 11/2016 |
| CN | 111585955 A | 8/2020 |
| CN | 112416739 A | 2/2021 |

* cited by examiner

*Primary Examiner* — Badri Champakesan
(74) *Attorney, Agent, or Firm* — IPro, PLLC (57) ABSTRACT

Disclosed are a URL parameter value anomaly detection method and system. The method includes obtaining a real-time request log; analyzing the real-time request log to generate one or more parameter values; classifying each parameter value based on a preset parameter value classification category to determine a parameter value category of a request URL in the real-time request log; generating a key according to a domain name, a request URI, and a parameter name in the real-time request log; retrieving a target dataset corresponding to the key from a pre-stored parameter feature library; and matching the parameter value category of the request URL in the real-time request log with a category and a category confidence level of the target dataset; and when they are not matched, it can be determined that the parameter value of the request URL in the real-time request log is anomalous.

9 Claims, 5 Drawing Sheets

URL PARAMETER VALUE ANOMALY DETECTION METHOD AND SYSTEM FOR THE SAME

CROSS-REFERENCE TO RELATED APPLICATIONS

The present application claims priority of Chinese Patent Application No. 2024100804266, filed on Jan. 19, 2024, the entire contents of which are hereby incorporated by reference.

TECHNICAL FIELD

The present disclosure relates to the field of cybersecurity technology, and in particular to a URL parameter value anomaly detection method and a system for the same.

BACKGROUND

With the development of the Internet, web application services have penetrated various sectors of society and become an integral part of people's work and life. Web attacks also increase rapidly and become a significant threat to the Internet while the web application services provide great convenience to people. Attack means are constantly being innovated, resulting in an increasing number of cybersecurity incidents, which not only cause economic losses but also deliver adverse impact on society.

In order to defend against the web attacks, traditional solutions involve deploying rule-based protection strategies on a Web Application Firewall (WAF), which can effectively block malicious attacks with obvious characteristics. However, the rule-based protection strategies cannot effectively deal with various attack tests that are strange or without obvious characteristics.

SUMMARY

In order to solve at least one technical problem described in the background, the present disclosure provides a URL parameter value anomaly detection method and a system for the same, which can effectively deal with various attacks that are strange or without obvious characteristics.

A first aspect of the present disclosure is to provide a URL parameter value anomaly detection method, including:
  obtaining a real-time request log, where the real-time request log includes current http request data;
  analyzing the real-time request log to generate one or more parameter values;
  classifying each parameter value based on a preset parameter value classification category to determine a parameter value category of a request URL in the real-time request log;
  generating a key according to a domain name, a request URI, and a parameter name in the real-time request log;
  retrieving a target dataset corresponding to the key from a pre-stored parameter feature library, where the parameter feature library stores a mapping relationship between a plurality of keys and a category and a category confidence level of the target dataset based on a historical request log; and
  matching the parameter value category of the request URL in the real-time request log with the category and the category confidence level of the target dataset; and when they are not matched, it can be determined that the parameter value of the request URL in the real-time request log is anomalous.

In one embodiment, before the analyzing the real-time request log, the method further includes:
  performing data cleaning on the real-time request log; and
  the data cleaning includes:
  when key data of the real-time request log does not exist in the parameter feature library, a current real-time request log is filtered;
  when no parameters exist in the request URL of the real-time request log, the current real-time request log is filtered; and
  when an http request in the real-time request log is detected but not intercepted by cloud protection, the current real-time request log is filtered.

In one embodiment, the analyzing the real-time request log to generate one or more parameter values includes:
  performing a parameter key-value pair splitting on the real-time request log to obtain one or more parameter names and parameter values; and
  performing invalid filtering on all parameters according to character features of the parameter names to obtain one or more values of valid parameters.

In one embodiment, the preset parameter value classification category includes a pure number category, a pure English category, a URL category, and an EMAIL=category.

In one embodiment, a process of generating a mapping relationship between the plurality of keys and the category and the category confidence level of the target dataset based on a historical request log includes:
  obtaining the historical request log, where the historical request log includes http request data at a historical moment;
  performing data preprocessing of the historical request log to determine a parameter value category of a request URL in the historical request log, where the data preprocessing includes parameter key-value pair splitting, invalid parameter filtering and parameter value classification;
  performing data merge of all preprocessed historical request logs, and the data merge includes:
  generating a key according to the domain name, the request URI, and the parameter name in each historical request log;
  selecting data with the same key and merging thereof to form a dataset;
  determining the category and the category confidence level of the dataset based on the consistency of parameter value categories in the dataset; and
  storing the mapping relationship between the key and the category and the category confidence level of the dataset to generate the parameter feature library.

In one embodiment, the determining a category and a category confidence level of the dataset based on the consistency of parameter value categories in the dataset includes:
  determining whether the parameter value categories in the dataset are the same;
  when the parameter value categories are all the same, a category of the dataset is determined to be a current parameter value category, and the category confidence level is set to 100; or
  when the parameter value categories in the dataset are different, and are only the pure number category and the pure English category, the category of the dataset is determined to be a category of combination of the number and English characters, and the category confidence level is set to 100; alternatively, when the parameter value categories in the dataset are different, and include neither the pure number category nor the pure English category, or do not only include the pure number category and the pure English category, one parameter value category with a largest proportion is selected and determined to be the category of the dataset, and the category confidence level is set to a proportion ratio value of the parameter value category with the largest proportion.

In one embodiment, before the performing data preprocessing of the historical request log, the method also includes:

performing data cleaning of the historical request log, and the data cleaning includes:

a request is forwarded to an origin server, and the origin server responds normally; the request URL contains a parameter value pair, and a request URL path does not contain special characters; and when any of above conditions is not satisfied, a current historical request log will be filtered.

In one embodiment, the matching the parameter value category of the request URL in the real-time request log with the category and the category confidence level of the target dataset includes:

determining whether the category confidence level of the target dataset is 100;

when the category confidence level is 100, it is to determine whether the parameter value category of the request URL in the real-time request log is consistent with the category of the target dataset; and when they are inconsistent, it can be determined that the parameter value of the request URL in the real-time request log is anomalous, and an anomalous confidence level is set to 100; or when the category confidence level is not 100, it is to determine whether the parameter value category of the request URL in the real-time request log is consistent with the category of the target dataset; and when they are inconsistent, it is to determine whether the parameter value of the request URL in the real-time request log contains a special character, when it contains the special character, it can be determined that the parameter value of the request URL in the real-time request log is anomalous, and the anomalous confidence level is set to a difference between 100 and the category confidence level.

In one embodiment, the method also includes:

performing an anomaly handling on an http request with URL parameter value anomaly according to the anomalous confidence level; and different anomaly handling is performed according to a value of the anomalous confidence level.

A second aspect of the present disclosure is to provide a URL parameter value anomaly detection system, including:

a data acquisition module configured to obtain a real-time request log, where the real-time request log includes current http request data;

a data analysis module configured to analyze the real-time request log to generate one or more parameter values;

a data pre-processing module configured to classify each parameter value based on a preset parameter value classification category to determine a parameter value category of a request URL in the real-time request log;

a key generation module configured to generate a key according to a domain name, a request URI, and a parameter name in the real-time request log;

a data extraction module configured to retrieve a target dataset corresponding to the key from a pre-stored parameter feature library, where the parameter feature library stores a mapping relationship between a plurality of keys and a category and a category confidence level of the target dataset generated based on a historical request log; and an anomaly detection module configured to match the parameter value category of the request URL in the real-time request log with the category and the category confidence level of the target dataset; and when they are not matched, it can be determined that the parameter value of the request URL in the real-time request log is anomalous.

Through the technical solution of the present disclosure, the following technical effects may be achieved:

The URL parameter value anomaly detection method and system provided by the present disclosure analyze historical request logs offline, perform statistical analysis on each request parameter value, identify the category of each parameter value to generate a parameter feature library, and detect real-time access logs based on the parameter feature library to determine whether the current request is anomalous, such that various anomalous attacks without obvious features can be effectively detected; additionally, the anomaly detection is performed based on the parameter feature library generated offline, ensuring rapid detection speed and improving anomaly handling efficiency.

BRIEF DESCRIPTION OF THE DRAWINGS

In order to more clearly illustrate the technical solution in the embodiments of the present disclosure, the accompanying drawings required to be used in the embodiments or the prior art description are simply introduced below. Obviously, the accompanying drawings described below are only some embodiments of the present disclosure, for those of ordinary skill in the art, other accompanying drawings may further be derived from the accompanying drawings without making inventive efforts.

DETAILED DESCRIPTION

In order to make the purposes, technical solutions, and advantages of the embodiments of the present disclosure clearer, the technical solutions of the embodiments of the present disclosure will be described clearly and completely with reference to the accompanying drawings of the embodiments of the present disclosure. Apparently, the described embodiments are some, but not all, embodiments of the present disclosure. Based on the described embodiments of the present disclosure, all other embodiments attainable by those ordinarily skilled in the art without involving any inventive effort are within the protection scope of the present disclosure.

It should be noted that the terms "first", "second", "third", "fourth", etc. used in the specification, claims of the present disclosure are used to distinguish similar objects, and are not used to describe a specific sequence. The terms "include/comprise" and "have/having" and any variations thereof are intended to cover non-exclusive inclusion.

Figure 1:
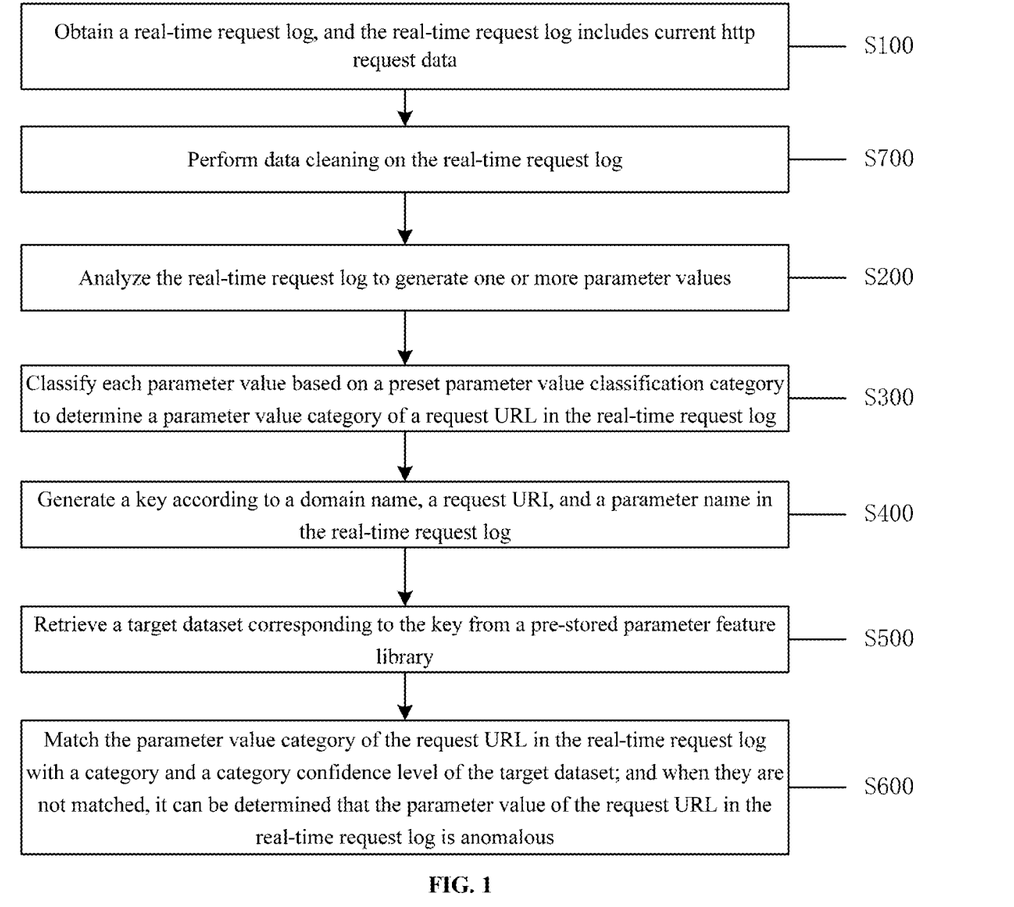
FIG. 1 is a schematic flow diagram of a URL parameter value anomaly detection method according to an embodiment of the present disclosure.

According to one embodiment of the present disclosure, FIG. 1 is a schematic flow diagram of a URL parameter value anomaly detection method according to the embodiment of the present disclosure. The method can be deployed in a cloud Web Application Firewall (WAF) system, and the method is aimed at a URL parameter value anomaly detection process for a single real-time request log. Of course, in practical applications, the URL parameter value anomaly detection can be performed synchronously on a plurality of real-time request logs. Specifically, as shown in FIG. 1, the embodiment of the present disclosure provides a URL parameter value anomaly detection method, including the following steps:

S100: obtaining a real-time request log, where the real-time request log includes current http request data;

specifically, for each http request from a client, one real-time request log is generated on a server to record user request information, where the current http request data includes a domain name, a Uniform Resource Identifier (URI), a parameter name, and a parameter value.

S200: Analyzing the real-time request log, to generate one or more parameter values; before the step S200, the method further includes:

S700: performing data cleaning on the real-time request log; and the cleaning includes: when key data of the real-time request log does not exist in a parameter feature library, a current real-time request log is filtered; when no parameters exist in a request URL of the real-time request log, the current real-time request log is filtered; and when an http request in the real-time request log is detected but not intercepted by cloud protection, the current real-time request log is filtered.

Specifically, when the key data of the real-time request log does not exist in the parameter feature library, it is impossible to determine a dataset to which the parameter value belongs, therefore, filtering needs to be performed; when the http request is intercepted by other policies, there is no need to perform anomaly detection, therefore, when the http request is detected but not intercepted by the cloud protection, filtering also needs to be performed. In the step, data that is unnecessary or does not need to be processed is pre-filtered out in advance to avoid invalid processing, thereby improving a processing speed of subsequent data, and improving the efficiency of the anomaly detection.

Since each real-time request log must contain the parameter name and corresponding parameter value of the request, one http request may carry one parameter name and parameter value, or may carry more than two parameter names and parameter values, the present disclosure performs the anomaly detection based on the parameter value(s).

Figure 2:
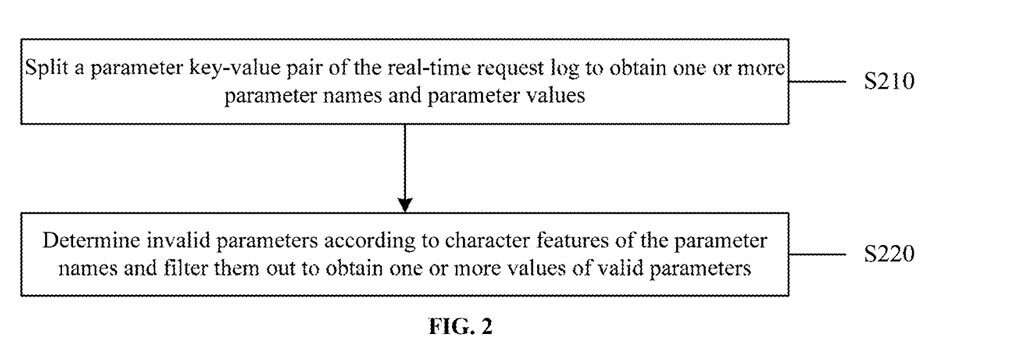
FIG. 2 is a flowchart of a method for analyzing a real-time request log according to an embodiment of the present disclosure.

FIG. 2 shows a flowchart of a method for analyzing the real-time request log. As shown in FIG. 2, the method for analyzing the real-time request log includes:

S210: performing parameter key-value pair splitting on the real-time request log, to obtain one or more parameter names and parameter values;

in the step, a process of the performing parameter key-value pair splitting includes: splitting all parameters in the request URL according to a "&" delimiter, for example, "keyword=programming" and "category=web" are two parameters in a split http request, that is, one key-value pair can be considered to be one parameter; and then splitting the key-value pair of each parameter according to a "=" delimiter to obtain a parameter name field and a parameter value field.

S220: determining invalid parameters according to character features of the parameter names and filtering thereof, to obtain one or more values of valid parameters.

The step involves filtering the key-value pairs after splitting, specifically, detecting whether the parameter name is a normal character, and when it contains an anomalous character, such as a combination of a non-digit character, a letter, a hyphen or an underscore, the current parameter is considered to be the invalid parameter and filtered out. When the parameter name is the normal character, it is considered to be the valid parameter, and the corresponding parameter value is then decoded using URL decoding, to convert characters encoded in the URL back to their original character forms, for example, "% 20" is decoded as a space character, and "% 3D" is decoded as an equal sign character. When the parameter value does not contain any encoded characters, a parameter value string after decoding is the same as a parameter value string before decoding.

S300: Classifying each parameter value based on a preset parameter value classification category, to determine a parameter value category of the request URL in the real-time request log; and after obtaining one or more parameter values in the steps S200 or S220, each parameter value is classified to obtain a category to which the parameter value belongs, such that a category to which the parameter in the current real-time request log belongs is determined. Each parameter is assigned to one category, and different parameters in one http request are assigned to different categories.

In this embodiment, the parameter values are classified according to a preset category feature method, the category feature method can be generated based on data learning or expert experience, and is used to determine a category in the preset parameter value classification category to which the parameter value belongs, so as to obtain a parameter value category of each parameter, and then to identify one or more parameter value categories corresponding to the real-time request log. Optionally, the preset parameter value classification category includes a pure number category, a pure English category, a URL category, and an EMAIL=category. In other embodiments, the preset parameter value classification category can be extended based on the above four categories, which are not limited herein.

S400: Generating a key according to a domain name, a request URI, and a parameter name in the real-time request log; and in the step, the domain name, the request URI, and the parameter name are inputted into a preset key generation condition, and a corresponding key can be output. Specifically, the preset key generation condition is used to aggregate the domain name, the request URI and the parameter name, and finally represent them with a key string to facilitate subsequent anomaly detection. In this embodiment, the preset key generation condition is an MD5 algorithm, which generates a hash value from three parameters of the domain name, the request URI, and parameter name.

Figure 3:
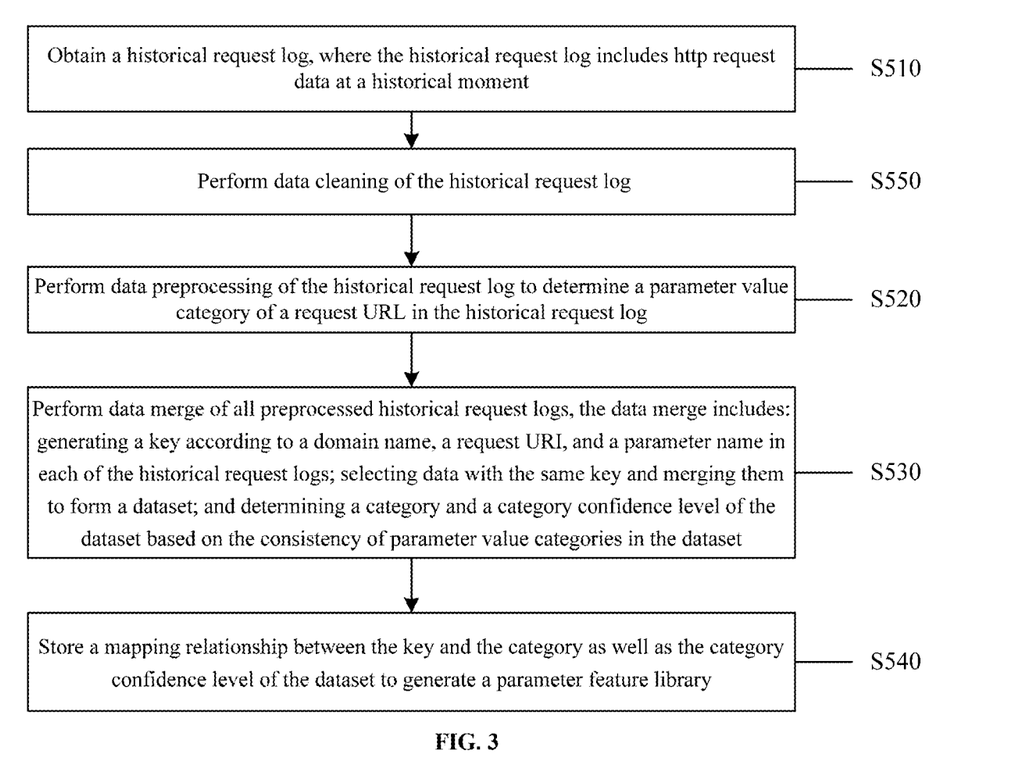
FIG. 3 is a flowchart of a method for generating a parameter feature library according to an embodiment of the present disclosure.

S500: Retrieving a target dataset corresponding to the key from a pre-stored parameter feature library, where a mapping relationship between a plurality of keys and a category and a category confidence level of the target dataset generated based on a historical request log is stored in the parameter feature library;

the parameter feature library is generated offline, and the parameter features are obtained from the historical request log. FIG. 3 shows a flowchart of a method for generating the parameter feature library, that is, a process of generating a mapping relationship between a plurality of keys and a category and a category confidence level of the dataset based on the historical request log. Specifically, as shown in FIG. 3, a process of generating the mapping relationship between the plurality of keys and the category and the category confidence level of the dataset based on a historical request log includes:

S510: obtaining the historical request log, where the historical request log includes http request data at a historical moment; and S520: performing data preprocessing of the historical request log to determine a parameter value category of a request URL in the historical request log, where the data preprocessing includes parameter key-value pair splitting, invalid parameter filtering and parameter value classification; and a process of the parameter key-value pair splitting can refer to the step S210, a process of the invalid parameter filtering can refer to the step S220, and a process of the parameter value classification refers to the step S300.

Before the step S520, the method further includes:

S550: performing data cleaning of the historical request log, specifically, the data cleaning includes:

a request is forwarded to an origin server, and the origin server responds normally; the request URL contains a parameter value pair, and a request URL path does not contain special characters; and when any of the aforesaid conditions is not satisfied, a current historical request log will be filtered. Specifically, the special characters are characters that are not commonly used by those skilled in the art. In the present disclosure, data that does not need to be processed is filtered out by cleaning a plurality of the historical request logs, such that the parameter feature library becomes more accurate, and the accuracy of subsequent anomaly detection is improved.

Figure 4:
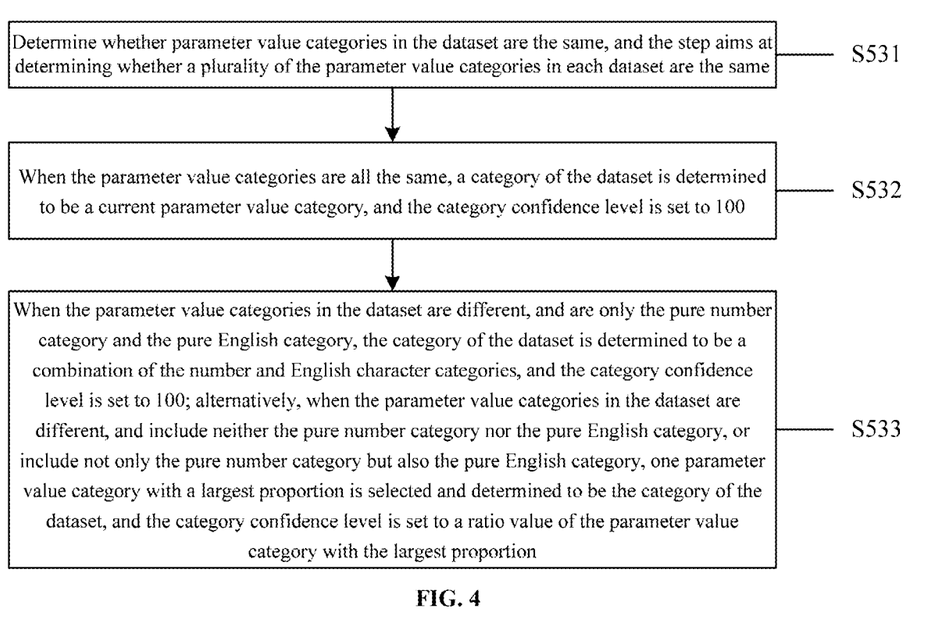
FIG. 4 is a flowchart of a method for determining a category and a category confidence level of the dataset based on the consistency of parameter value categories in a dataset according to an embodiment of the present disclosure.

S530: Performing data merge of all preprocessed historical request logs, and the data merge includes:

step 1: generating a key according to a domain name, a request URI, and a parameter name in each of the historical request logs, and the step can refer to the step S400 above; and step 2: selecting data with the same key and merging them to form a dataset; in this step, when the domain name, the request URI, and the parameter name are the same, the generated key is the same key. The corresponding data under the same key, such as the parameter value and the parameter value category, are aggregated together to form the dataset, this process does not change any fields, and the fields are independent of each other. the step 2 finally presents different datasets corresponding to different keys, and each key corresponds to one dataset; and step 3: determining a category and a category confidence level of the dataset based on the consistency of parameter value categories in the dataset; specifically, after a plurality of the datasets are obtained through clustering in the step 2, a category and a category confidence level of each dataset are set respectively. FIG. 4 shows a flowchart for determining a category and a category confidence level of the dataset based on the consistency of parameter value categories in the dataset, and as shown in FIG. 4, the step 3 specifically includes:

S531: determining whether the parameter value categories in the dataset are the same, and the step aims at determining whether a plurality of the parameter value categories in each dataset are the same;

S532. when the parameter value categories are all the same, a category of the dataset is determined to be a current parameter value category, and the category confidence level is set to 100, where when the plurality of the parameter value categories in each dataset are consistent, for example, all are pure numbers, the category of the current dataset is set to be the "pure number category", and the category confidence level is set to 100; and the category confidence level is used to indicate that the parameter value category in the dataset is uniquely determined; and S533: when the parameter value categories in the dataset are different, and are only the pure number category and the pure English category, the category of the dataset is determined to be a combination of the number and English character categories, and the category confidence level is set to 100; alternatively, when the parameter value categories in the dataset are different, and include neither the pure number category nor the pure English category, or do not only include the pure number category and the pure English category, one parameter value category with a largest proportion is selected and determined to be the category of the dataset, and the category confidence level is set to a proportion ratio value of the parameter value category with the largest proportion.

Specifically, when a plurality of parameter value categories in the dataset are different, and it can be determined that the many parameter value categories are a combination of pure number category and pure English category, the category of the current dataset is considered to be uniquely determined, that is, the pure number category and the purse English category, and a category confidence level is set to 100; when a plurality of parameter value categories in the dataset include neither pure number category nor purse English category, or are not purely number category and pure English category, the category with a largest number of the same category in the plurality of parameter value categories is calculated, for example, 6 of 10 parameter value categories are the URL category, the URL category is determined to be a category of the current dataset, and a proportion of a number of URLs is determined to be a category confidence level, that is, 60.

S540: Storing the mapping relationship between the key and the category and the category confidence level of the dataset to generate the parameter feature library.

Specifically, the data merged in the step S530 generates the parameter feature library; and the parameter feature library is generated according to a built-in data format, and the parameter feature library contains the key, the category and the category confidence level of the dataset. It can be understood that the parameter feature library is generated by analyzing features of historical data, and subsequent anomaly detection is performed by matching and evaluating the parameter feature library.

In other optional embodiments, the method further includes: regularly updating the parameter feature library. Specifically, the parameter feature library is regularly generated once based on historical data, and parameter features generated historically are merged.

After the parameter feature library is generated according to the steps S510-S540, the step S500 searches for the key of the current real-time request log in the parameter feature library; and after the key is found, a dataset corresponding to the key can be extracted, and the dataset is the target dataset.

S600: Matching the parameter value category of the request URL in the real-time request log with the category and the category confidence level of the target dataset; and when they are not matched, it can be determined that the parameter value of the request URL in the real-time request log is anomalous.

Figure 5:
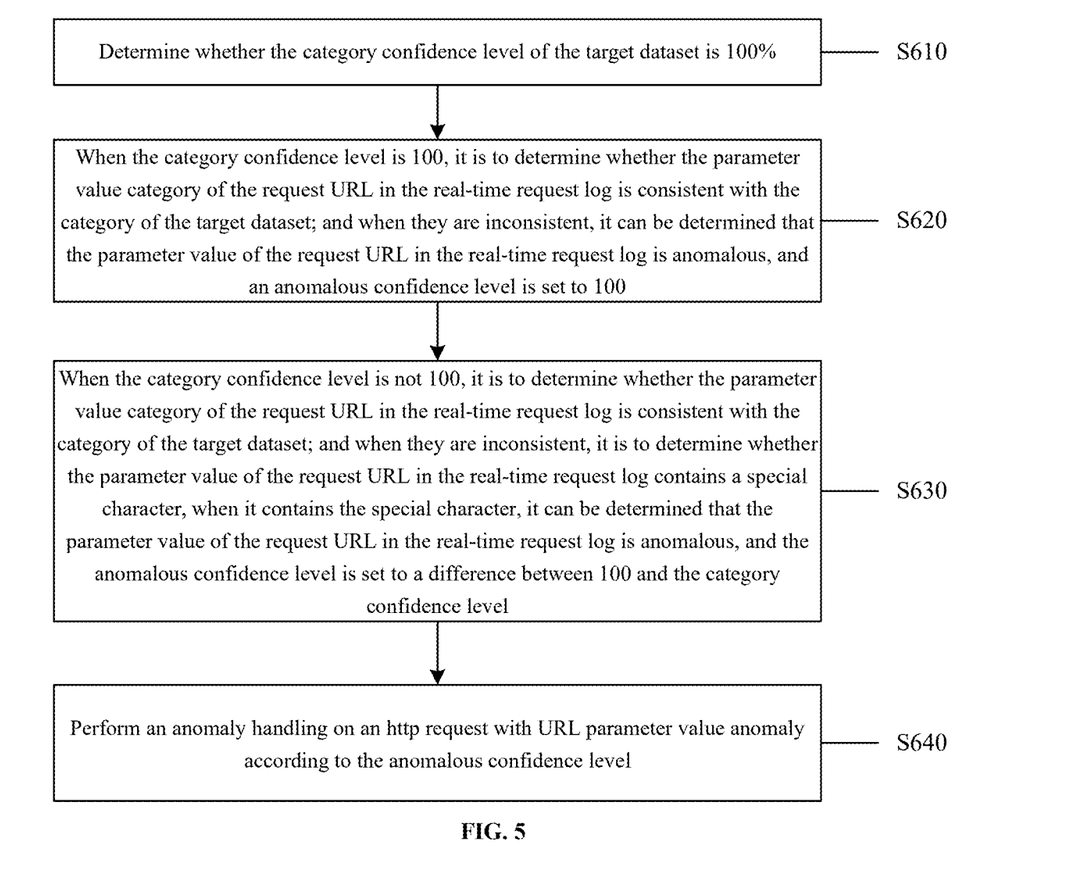
FIG. 5 is a flowchart of a method for matching a parameter value category of a request URL in a real-time request log with a category and a category confidence level of a target dataset according to an embodiment of the present disclosure.

Specifically, FIG. 5 shows a flowchart of a method for matching the parameter value category of the request URL in the real-time request log with the category and the category confidence level of the target dataset; and as shown in FIG. 5, the step S600 includes:

S610: determining whether the category confidence level of the target dataset is 100; and the category confidence level can be used to check whether the parameter value category of the current real-time request log is determined, further determination is made according to a parameter value category determination method, and different category confidence levels correspond to different parameter value category determination methods;

S620. when the category confidence level is 100, it is to determine whether the parameter value category of the request URL in the real-time request log is consistent with the category of the target dataset; and when they are inconsistent, it can be determined that the parameter value of the request URL in the real-time request log is anomalous, and an anomalous confidence level is set to 100;

S630. when the category confidence level is not 100, it is to determine whether the parameter value category of the request URL in the real-time request log is consistent with the category of the target dataset; and when they are inconsistent, it is to determine whether the parameter value of the request URL in the real-time request log contains a special character, when it contains the special character, it can be determined that the parameter value of the request URL in the real-time request log is anomalous, and the anomalous confidence level is set to a difference between 100 and the category confidence level. The special characters are characters that are considered inappropriate for the URL parameter value.

In other optional embodiments, the method further includes:

S640: performing an anomaly handling on an http request with URL parameter value anomaly according to the anomalous confidence level; and different anomaly handling is performed according to a value of the anomalous confidence level. The anomaly handling includes interception, redirection, JS verification, image verification, and slider verification. In this embodiment, the higher the anomalous confidence level, the more likely active interception handling is performed; and conversely, the lower the anomalous confidence level, the more likely verification handling is performed. That is to say, interception handling is performed for a serious anomaly, while verification handling is performed for a minor anomaly.

The URL parameter value anomaly detection method provided by the present disclosure can generate a parameter feature library based on historical request logs, and identify anomalous requests based on the real-time request log and the parameter feature library, such that various anomalous attacks without obvious features can be effectively detected; additionally, the anomaly detection is performed based on the parameter feature library generated offline, ensuring rapid detection speed and improving anomaly handling efficiency. Finally, the present disclosure provides anomaly handling for anomalous requests, thereby being capable of giving timely response to the anomalous requests.

Figure 6:
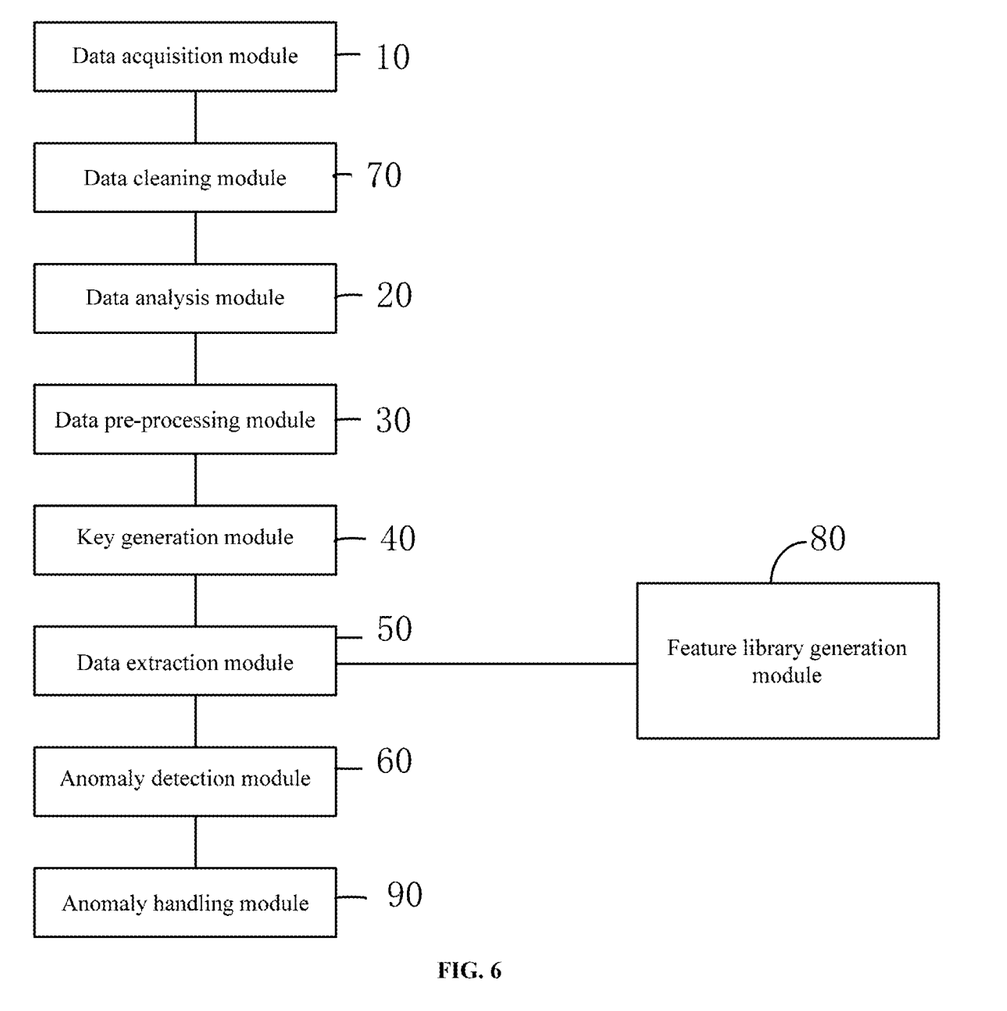
FIG. 6 is a schematic structural diagram of a URL parameter value anomaly detection system according to another embodiment of the present disclosure.

According to a second aspect, an embodiment of the present disclosure further provides a URL parameter value anomaly detection system corresponding to the above URL parameter value anomaly detection method. The same content can refer to the foregoing embodiments, which is not be repeated herein. FIG. 6 is a URL parameter value anomaly detection system according to an embodiment of the present disclosure, and the system includes:

a data acquisition module 10 configured to obtain a real-time request log, where the real-time request log includes current http request data;

a data analysis module 20 configured to analyze the real-time request log to generate one or more parameter values;

a data pre-processing module 30 configured to classify each parameter value based on a preset parameter value classification category to determine a parameter value category of a request URL in the real-time request log, where the preset parameter value classification category includes a pure number category, a pure English category, a URL category, and an EMAIL=category;

a key generation module 40 configured to generate a key according to the domain name, the request URI, and the parameter name in the real-time request log; and a data extraction module 50 configured to retrieve a target dataset corresponding to the key from a pre-stored parameter feature library, where the parameter feature library stores a mapping relationship between a plurality of keys and a category and a category confidence level of the target dataset generated based on a historical request log; and an anomaly detection module 60 configured to match the parameter value category of the request URL in the real-time request log with the category and the category confidence level of the target dataset; and when they are not matched, it can be determined that the parameter value of the request URL in the real-time request log is anomalous.

Further, the system also includes: a data cleaning module 70, and the data cleaning module 70 is configured to perform data cleaning on the real-time request log; and the data cleaning includes:

when key data of the real-time request log does not exist in the parameter feature library, a current real-time request log is filtered; when no parameters exist in the request URL of the real-time request log, the current real-time request log is filtered; and when an http request in the real-time request log is detected but not intercepted by cloud protection, the current real-time request log is filtered.

Further, the data analysis module 20 is also configured to split a parameter key-value pair of the real-time request log to obtain one or more parameter names and parameter values; and performing invalid filtering on all parameters according to character features of the parameter names to obtain one or more values of valid parameters.

Further, the system also includes a feature library generation module 80, and the feature library generation module 80 is configured to obtain a historical request log, where the historical request log includes http request data at a historical moment; and perform data preprocessing of the historical request log to determine a parameter value category of a request URL in the historical request log, where the data preprocessing includes parameter key-value pair splitting, invalid parameter filtering and parameter value classification; merge data of all preprocessed historical request logs, and the data merge includes: generating a key according to a domain name, a request URI, and a parameter name in each of the historical request logs, selecting data with the same key and merging them to form a dataset; determining a category and a category confidence level of the dataset based on the consistency of parameter value categories in the dataset; and storing the mapping relationship between the key and the category and the category confidence level of the dataset to generate a parameter feature library.

Further, the feature library generation module 80 is also configured to determine whether the parameter value categories in the dataset are the same; when the parameter value categories are all the same, a category of the dataset is determined to be a current parameter value category, and the category confidence level is set to 100; when the parameter value categories in the dataset are different, and are only the pure number category and the pure English category, the category of the dataset is determined to be a combination of the number and English character categories, and a category confidence level is set to 100; and alternatively, when the parameter value categories in the dataset are different, and include neither the pure number category nor the pure English category, or do not only include the pure number category and the pure English category, one parameter value category with a largest proportion is selected and determined to be the category of the dataset, and the category confidence level is set to a proportion ratio value of the parameter value category with the largest proportion.

Further, the feature library generation module 80 is also configured to perform data cleaning of the historical request log, and the data cleaning includes: a request is forwarded to an origin server, and the origin server responds normally; the request URL contains a parameter value pair, and a request URL path does not contain special characters; and when any of the aforesaid conditions is not satisfied, a current historical request log is filtered.

Further, the anomaly detection module 60 is configured to determine whether the category confidence level of the target dataset is 100; when the category confidence level is 100, it is to determine whether the parameter value category of the request URL in the real-time request log is consistent with the category of the target dataset; and when they are inconsistent, it can be determined that the parameter value of the request URL in the real-time request log is anomalous, and an anomalous confidence level is set to 100; when the category confidence level is not 100, it is to determine whether the parameter value category of the request URL in the real-time request log is consistent with the category of the target dataset; and when they are inconsistent, it is to determine whether the parameter value of the request URL in the real-time request log contains a special character, when it contains the special character, it can be determined that the parameter value of the request URL in the real-time request log is anomalous, and the anomalous confidence level is set to a difference between 100 and the category confidence level.

Further, the system also includes an anomaly handling module 90, the anomaly handling module 90 is configured to perform an anomaly handling on an http request with URL parameter value anomaly according to the anomalous confidence level; and different anomaly handling is performed according to a value of the anomalous confidence level.

The URL parameter value anomaly detection system provided by the present disclosure can generate a parameter feature library based on historical request logs, and identify anomalous requests based on the real-time request log and the parameter feature library, such that various anomalous attacks without obvious features can be effectively detected; additionally, the anomaly detection is performed based on the parameter feature library generated offline, ensuring rapid detection speed and improving anomaly handling efficiency. Finally, the present disclosure provides anomaly handling for anomalous requests, thereby being capable of giving timely response to the anomalous requests.

Those skilled in the art may use different methods to implement the described functions for each particular application, but such implementation should not be considered to be beyond the scope of the present disclosure. It will be apparent to those skilled in the art that, for the convenience and simplicity of description, specific working process of the above device and equipment can be referred to the corresponding process in the embodiments, which will not be described in detail herein.

In the embodiments provided in the present application, it should be understood that the disclosed device and method can be implemented in other ways. For example, the device embodiments described above are merely schematic.

It should be understood by those skilled in the art that the scope of the invention referred to in the present application is not limited to the technical solutions that are formed by combining the technical features described above with one another specifically, and should also encompass other technical solutions that are formed by combining the technical features described above or equivalents thereof with one another randomly without departing from the inventive concept. For example, the technical solutions formed by interchanging the features described above and the technical features, having similar functions, disclosed in the present application (but not limited thereto).

It should be understood that the sequence number of each step in the content and embodiments of the present disclosure does not necessarily mean the order of execution, and the execution order of each process should be determined based on its function and inherent logic, and should not be construed as any limitation on the implementation process of the embodiments of the present disclosure.

The invention claimed is:

1. A URL parameter value anomaly detection method, characterized in that, the method comprises:
   obtaining a real-time request log, the real-time request log comprises current http request data;
   analyzing the real-time request log, to generate one or more parameter values;

classifying categories based on a preset parameter value, classifying each parameter value, to determine a parameter value category of a request URL in the real-time request log;

generating a key according to a domain name, a request URI, and a parameter name in the real-time request log;

retrieving a target dataset corresponding to the key from a pre-stored parameter feature library; wherein a mapping relationship between a plurality of keys and a category and a category confidence level of a dataset generated based on a historical request log is stored in a parameter feature library; and matching the parameter value category of the request URL in the real-time request log with the category and the category confidence level of the target dataset; and when there is no match, it is determined that a parameter value of the request URL in the real-time request log is anomalous;

a process of generating the mapping relationship between the plurality of keys and the category and the category confidence level of the dataset based on the historical request log comprises: obtaining the historical request log, wherein the historical request log comprises http request data at a historical moment;

performing data preprocessing of the historical request log, to determine a parameter value category of a request URL in the historical request log; wherein the data preprocessing comprises a parameter key-value pair splitting, invalid parameter filtering and parameter value classification;

performing data merge of all preprocessed historical request logs, the data merge comprises: generating a key according to a domain name, a request URI, and a parameter name in each of the preprocessed historical request logs; selecting data with a same key and merging thereof to form the dataset;

determining a category and a category confidence level of the dataset based on consistency of parameter value categories in the dataset, the determining the category and the category confidence level of the dataset, based on the consistency of the parameter value categories in the dataset comprises: determining whether the parameter value categories in the dataset are the same when the parameter value categories in the dataset are different, and comprise neither a pure number category nor a pure English category, or do not only comprise the pure number category and the pure English category, a parameter value category with a largest proportion is selected and determined to be the category of the dataset, and the category confidence level is set to a proportion ratio value of the parameter value category with the largest proportion;

storing the mapping relationship between the key and the category and the category confidence level of the dataset, to generate the parameter feature library.

2. The URL parameter value anomaly detection method according to claim 1, characterized in that, before the analyzing the real-time request log, further comprising:

performing data cleaning on the real-time request log; wherein the data cleaning comprises:

when key data of the real-time request log does not exist in the parameter feature library, a current real-time request log is filtered;

when no parameters exist in the request URL of the real-time request log, the current real-time request log is filtered; and when an http request in the real-time request log is detected but not intercepted by cloud protection, the current real-time request log is filtered.

3. The URL parameter value anomaly detection method according to claim 1, characterized in that, the analyzing the real-time request log to generate one or more parameter values comprises:

performing a parameter key-value pair splitting on the real-time request log, to obtain one or more parameter names and parameter values;

performing invalid filtering on all parameters according to a character feature of the parameter names, to obtain one or more parameter values of a valid parameter.

4. The URL parameter value anomaly detection method according to claim 1, characterized in that, the parameter value categories in the dataset comprise a pure number category, a pure English category, a URL category, and an EMAIL category.

5. The URL parameter value anomaly detection method according to claim 1, characterized in that, the determining the category and the category confidence level of the dataset, based on the consistency of the parameter value categories in the dataset comprises:

determining whether the parameter value categories in the dataset are the same;

when all are the same, the category of the dataset is determined to be a current parameter value category, and the category confidence level is set to 100; or when the parameter value categories in the dataset are different, and are only a pure number category and a pure English category, the category of the dataset is determined to be a category of combination of number and English characters, and the category confidence level is set to 100.

6. The URL parameter value anomaly detection method according to claim 1, characterized in that, before the performing data preprocessing of the historical request log, further comprising:

performing data cleaning of the historical request log, wherein the data cleaning comprises:

a request is forwarded to an origin server, and the origin server responds normally; the request URL contains a parameter value pair; and a request URL path part does not contain a special character; and when any one of above conditions is not satisfied, a current historical request log is filtered.

7. The URL parameter value anomaly detection method according to claim 1, characterized in that, the matching the parameter value category of the request URL in the real-time request log with the category and the category confidence level of the target dataset comprises:

determining whether the category confidence level of the target dataset is 100;

when the category confidence level is 100, it is to determine whether the parameter value category of the request URL in the real-time request log is consistent with the category of the target dataset; and when they are inconsistent, it is determined that the parameter value of the request URL in the real-time request log is anomalous, and an anomalous confidence level is set to 100; or when the category confidence level is not 100, it is to determine whether the parameter value category of the request URL in the real-time request log is consistent with the category of the target dataset; and when they are inconsistent, it is to determine whether the parameter value of the request URL in the real-time request log contains a special character, when the special character is contained, it is determined that the parameter value of the request URL in the real-time request log is anomalous, and the anomalous confidence level is set to a difference between 100 and the category confidence level.

8. The URL parameter value anomaly detection method according to claim 7, characterized in that, the method further comprises:

performing an anomaly handling on an http request with URL parameter value anomaly, according to the anomalous confidence level; wherein different anomaly handling is performed according to a value of the anomalous confidence level.

9. A URL parameter value anomaly detection system, characterized in that, the system communicatively connected to memory comprises:

a data acquisition module, configured to obtain a real-time request log, the real-time request log comprises current http request data;

a data analysis module, configured to analyze the real-time request log, to generate one or more parameter values;

a data pre-processing module, configured to classify each parameter value based on a preset parameter value classification category, to determine a parameter value category of a request URL in the real-time request log;

a key generation module, configured to generate a key according to a domain name, a request URI, and a parameter name in the real-time request log;

a data extraction module, configured to retrieve a target dataset corresponding to the key from a pre-stored parameter feature library, the pre-stored parameter feature library stores a mapping relationship between a plurality of keys and a category and a category confidence level of a dataset generated based on a historical request log;

an anomaly detection module, configured to match the parameter value category of the request URL in the real-time request log with the category and the category confidence level of the target dataset; when they do not match, it is determined that the parameter value of the request URL in the real-time request log is anomalous;

a feature library generation module, configured to obtain a historical request log, the historical request log comprises http request data at a historical moment; perform data preprocessing of the historical request log, to determine a parameter value category of a request URL in the historical request log; wherein the data preprocessing comprises parameter key-value pair splitting, invalid parameter filtering and parameter value classification; merge data of all preprocessed historical request logs, and the data merge comprises: generating a key according to a domain name, a request URI, and a parameter name in each of the historical request logs, selecting data with the same key and merging them to form a dataset; determining a category and a category confidence level of the dataset based on consistency of parameter value categories in the dataset; and storing the mapping relationship between the key and the category and the category confidence level of the dataset to generate the pre-stored parameter feature library.

* * * * *